United States Patent [15] 3,663,371
Viccaro et al. [45] May 16, 1972

[54] METHOD OF PRODUCING DEXTRANASE

[72] Inventors: John P. Viccaro, Jamaica, N.Y.; John M. Weaver, Glen Rock, N.J.

[73] Assignee: Lever Brothers Company, New York, N.Y.

[22] Filed: May 26, 1970

[21] Appl. No.: 40,723

[52] U.S. Cl. ........................................................195/66 R
[51] Int. Cl. ..................................................C12d 13/10
[58] Field of Search ........................................195/62, 65, 66

[56] References Cited

OTHER PUBLICATIONS

Tsuchiya et al., Journal of Bacteriology Vol. 64 pages 513–519 (1952).

*Primary Examiner*—Lionel M. Shapiro
*Attorney*—Brumbaugh, Graves, Donohue & Raymond

[57] ABSTRACT

Dextranase is obtained by propagating *Penicillium aculaetum* in a nutrient medium containing dextran and thereafter recovering the enzyme from the medium.

6 Claims, No Drawings

METHOD OF PRODUCING DEXTRANASE

The present invention relates to a method of producing dextranase as an elaboration product of the growth of the microorganism *Penicillium aculaetum* in a nutrient medium containing dextran.

The production of dextran-hydrolyzing enzymes by cultivating the enzyme-producing organisms in nutrient media containing dextrans is well known. The dextranases are extracellular and were first detected by Hultin and Nordstrom [Investigations on Dextranase. I. On the Occurrence and Assay of Dextranase, Acta. Chem. Scand. 3:1405-1417 (1949)]. It has also been recognized in the art that a number of strains of fungi produce dextranase, including cultures of *Penicillium funiculosum* (NRRL 1132), *P. funiculosum* (NRRL 1768), *P. lilacinum* (NRRL 896) and *P. verruculosum* (NRRL 2135); these are described by Tsuchiya et al. [J. Bact. 64. 513-519 (1952).

The applicants have found that *Penicillium aculaetum*, and specifically the strains *Penicillium aculaetum* ATCC No. 20242 and *Penicillium acelaetum* ATCC No. 10409, provides dextranase when grown in a medium containing nutrients necessary to the growth of the microorganism and additionally containing dextran. To applicants' knowledge, the art has not recognized that the aculaetum species provide dextranase as an extracellular enzyme. In addition, it has been found that the yield of dextranase obtained using the microorganisms of the present invention exceed the yields obtained from the organisms known to the prior art by at least tenfold.

The procedure for preparing dextranase found most advantageous in accordance with this invention involves essentially a three-stage process. The *Penicillium aculaetum* organism is cultivated in stock cultures on Emerson YpSs–1% Dextrose Agar slants at 28° C. for 10 days. The fully grown slants are maintained at 4° C. prior to use, with transfers being made every 3 months.

The first stage of the process is the preparation of a seed culture. A preferred medium for both growth and seed stages of the process consists of 2% of 5–50 million mol. wt. dextran, 1% soybean meal, 0.04% $CaCl_2 \cdot 2H_2O$, 0.02% $MgCl_2 \cdot 6H_2O$ in 0.1M $Na_2HPO_4$–$NaH_2PO_4$ buffer at pH 6.0.

In preparing the seed stage, 5 ml. of sterile distilled water is added to a slant of the organism, and a suspension of the fungus is prepared. The entire suspension is aseptically introduced into a 250 ml. Erlenmeyer flask containing 50 ml. of sterile medium described above. The flask is shaken on a reciprocal shaker at 225 rpm from 5 to 7 days at 26° C.

At the end of this period, 400 ml. of the same medium, contained in a 2-liter Erlenmeyer flask, is inoculated with the entire contents of the seed flask. Incubation of the second stage flask is conducted on a reciprocal shaker at 225 rpm and 26° C. for from 4 to 6 days.

In a third stage, fermentations may be carried out using a New Brunswick Microferm Fermentor. Five liters of the medium described above and 10 ml. of an antifoaming agent, Antifoam-A, are placed in a 14-liter fermentation jar. The Antifoam-A is a proprietary product of Dow Corning Corp., Midland, Mich. The entire contents of the second stage flask is used as the inoculum for the fermentor. The culture in the fermentor is incubated for 10–12 days at 26° C. with moderate aeration and agitation.

At the end of the growth period, the mycelium and insoluble substances are removed from the culture medium by centrifugation. Dextranase is precipitated from the supernatant by the addition of 1.5 volumes of acetone (sufficient to achieve a final concentration of 60% V/v) at −10° C. The precipitate is collected in a Buchner funnel and dried with repeated additions of acetone at −20° C. The acetone-dried enzyme preparation is stored at 4° C. until used.

Crude dextranase obtained above is further purified by preparing a 6 percent aqueous solution of the acetone-dried powder. The mixture is stirred for 3 to 4 hours to insure complete dissolution and then stored overnight at 4° C. The insoluble fraction of the powder is removed by centrifugation, and $CaCl_2$ is added at a 0.12 molar concentration to the clear supernatant. The resulting precipitate, which consisted mainly of calcium phosphate, is removed by centrifugation. One-half volume of acetone is added to the supernatant liquid at −4° C. with continuous stirring and stored at −20° C. for 1 hour. The insoluble material is removed by centrifugation. An additional 1.0 volume of acetone is added to the clear supernatant and allowed to stand at −20° C. for 3 hours. The precipitate is collected by centrifugation, dissolved in a minimum volume of water, and then dialyzed against 10 liters of 0.001M $CaCl_2$ for 18 hours at 6° C. The non-dialyzable material is collected and lyophilized.

Other nutrients rich in protein, including corn-steep liquor and defatted cottonseed meal (Pharmamedia, sold by Traders Oil Mill Co., Fort Worth, Tex.), can be used in place of soybean meal as a source of nitrogen. However, when the dextran is replaced by dextrin or glucose as the carbon source, appreciable dextranase is not produced. The extracellular dextranase is an inducible enzyme; dextran must be present in the medium for the microorganism to produce significant amounts of dextranase.

A medium containing 2% dextran and 1.5% corn-steep liquor is a suitable medium. The presence of small amounts of metal ions, such as $Ca^{++}$ and $Mg^{++}$ has a slight enhancing effect on the yield of enzyme.

The optimal pH for the process of the present invention is pH 6.0. Variations in either direction from the optimum give reduced yields of enzyme. The temperature of incubation has also been found to be critical. A range of 25°–27° C. must be maintained for the maximum yield of dextranase. A temperature above 28° C. provides a greatly reduced yield of enzyme; 26° C. is preferred.

Similarly, the rate of agitation has been found to be an important consideration, in that excessive agitation is to be avoided. In the apparatus used in the process described above, 200–300 rpm is optimal, and a rate of 500–650 rpm is undesirable and causes a considerable decrease in the yield of enzyme.

The resulting dextranase was found to be most active against linear dextrans at a pH of approximately 5.0–5.5. The enzyme was found to be stable within a pH range of 3.0–7.5, and displayed maximum activity at a temperature of 55° C. Dextranolysis is inhibited by $Hg^{++}$, $Co^{++}$ and $Ag^+$ ions. Metal chelating agents, such as ethylenediaminetetracetate and o-phenanthroline, and sulfhydryl inhibitors, such as p-chloromercuribenzoate and iodoacetic acid, have no effect on dextranase activity.

A typical analysis of dextranase produced by the process of this invention is as follows:

TABLE I

Analysis of Crude Dextranase

| | |
|---|---|
| Dextranase Activity | 260 units/mg. |
| Protease Activity | no activity |
| Amylase Activity | slight activity |
| Carbohydrate | 16.0% |
| Protein | 5.5% |
| Nitrogen | 1.09% |
| Carbon | 11.96% |
| Phosphorus | 14.7% |
| Sulfur | Trace |
| Calcium | 0.02% |
| Ash | 61.3% |

The high ash content is due to the high concentration of phosphate buffer from the fermentation medium.

EXAMPLE 1

A sterile aqueous medium comprising 2% of a dextran having a mol. wt. of 5–50 million, supplied by Henley and Co., New York, N.Y., 1% of soybean meal, designated 44% SBOM, supplied by the Chemurgy Division of Central Soya, Chicago, Ill., 0.04% $CaCl_2$, and 0.02% $MgCl_2$ in 0.1M $Na_2HPO_4$–$NaH_2PO_4$ at pH 6 was prepared. This medium was used at each subsequent stage of the process.

A stock culture of *Penicillium aculaetum* ATCC No. 20242 on Emerson YpSs–1% Dextrose Agar slants was used in the first run, identified hereinafter as Run A. *Penicillium aculaetum* ATCC No. 10409 on the same type of agar slants was used in the second run, identified hereinafter as Run B. In both instances, the procedure described below was followed.

Five ml. of sterile distilled water was added to a slant of the organism and a fungal suspension was prepared. This suspension was aseptically introduced into a 250 ml. Erlenmeyer flask containing 50 ml. of the sterile medium. The flask was shaken under aerobic conditions on a reciprocal shaker at 225 rpm for 5 to 7 days at 26° C.

At the end of this period, 400 mm. of the same sterile medium contained in a 2-liter Erlenmeyer flask was inoculated with the entire contents of the 250 ml. Erlenmeyer flask from the first stage. Incubation of the second-stage flask was carried out at 225 rpm on a reciprocal shaker at 26° C. for from 4 to 6 days.

In the third stage of the process, the contents of the 2-liter Erlenmeyer flask were used as an inoculum for 5 liters of the growth medium containing 10 ml. of Antifoam-A in a 14-liter fermentation jar. This jar was incubated for 10 to 12 days at 26° C., with aeration at one-half volume and agitation of about 250 rpm.

At the end of the growth period, the mycelium and insoluble substances were removed from the medium by centrifugation. Dextranase was subsequently precipitated from the supernatant liquid by adding 1.5 volumes of acetone at −10° C. The precipitate was collected in a Buchner funnel and dried with repeated additions of acetone at −20° C. In order to preserve its activity, the acetone-dried enzyme was stored at 4° C. until used.

A crude dextranase was subjected to further purification by first preparing a 6 percent aqueous solution of the acetone-dried powder. In order to completely dissolve the dextranase, the mixture was stirred for 3 to 4 hours and then stored overnight at 4° C. The insoluble fraction of the powder was removed by centrifugation, and the equivalent of a 0.12 molar concentration of $CaCl_2$ was added to the clear supernatant. The resulting precipitate, consisting mainly of calcium phosphate, was allowed to stand 0° C. for 15 minutes before being removed by centrifugation. One-half volume of acetone is added to the supernatant liquid at −4° C. with continuous stirring and stored at −20° C. for 1 hour. The insoluble material is removed by centrifugation. An additional 1.0 volume of acetone was added to the clear supernatant and allowed to stand at −20° C. for 3 hours. The precipitate is collected by centrifugation, dissolved in a minimum volume of water and then dialyzed against 10 liters of 0.001M $CaCl_2$ for 18 hours at 6° C. The non-dialyzable material was collected and lyophilized.

The dextranase activity of Runs A and B was determined by the Tsuchiya method [Dextran Degrading Enzymes from Molds. J. Bacteriol. 64:513 (1952)], with several modifications. The assay was conducted as follows:

Reagents
1. 0.1M Acetate buffer, pH 5.4.
2. 2.5% Dextran — clinical grade — molecular weight 200,000 to 300,000 (from General Biochemicals) dissolved in reagent 1.
3. 3,5 DNS reagent: add 5.0 gm. of 3,5-dinitrosalicylic acid monohydrate (Aldrich Chemical) to 100 ml. 2N NaOH. Stir and add 250 ml. distilled water. When completely dissolved, add 150 gm. potassium sodium tartrate slowly, with stirring. When dissolved, bring to a final volume of 50 ml.

Assay
1. Dissolve or dilute (enzyme, filtrate, etc.) to appropriate concentration with reagent 1 (buffer).
2. A. Blank tube: deliver 2.0 ml. of reagent 2, 3.0 ml. of reagent 3, and 1.0 ml. of enzyme solution into a 16 × 150 mm. tube. Shake.
   B. Sample tube: deliver 2.0 ml. of reagent 2. Make duplicate tubes for each sample.
3. Incubate all tubes in a 40° C. bath for 5 minutes.
4. Deliver 1.0 ml. of enzyme to each sample tube at timed intervals. Shake.
5. Total incubation time is exactly 20 minutes.
6. When time is up, deliver 3.0 ml. reagent 3 to sample tubes at similar time intervals and shake. Final volume of each tube is 6.0 ml.
7. Place tubes in boiling water for 5 minutes.
8. Cool and read the optical density at 540mμ of each sample against its own blank.

Calculation
1. Find the mg./ml. concentration of maltose from the O.D. on the standard curve.
2. Mg./ml. × 3 (time factor) × dilution factor = $\mu$/ml. at 40° C.
3. One unit is number of mgs. maltose/hr. assayed at pH 5.4 and a temperature of 40° C.

Notes
1. O.D. should not exceed 1.20 ideally should be around 0.8.
2. Standard Maltose curve is run using the same volumes as the assay.

The crude supernatant from both Runs A and B was assayed to contain approximately 4,000–6,500 units of dextranase per ml. The initial acetone precipitation gave 8–10 g. of acetone-dried powder per liter of this powder at a potency of 375–500 units per mg. Further purification by acetone fractionation, calcium chloride treatment, dialysis and lyophilization provides a preparation containing 1,500–2,000 units per mg.

Based on the amount of dextran and nitrogen consumed, the level of 6,500 units per ml. represents approximately a tenfold increase in yield over yields obtained using the most efficient strain of dextranase-producing Penicillium heretofore known.

We claim:
1. A method for producing dextranase which comprises the steps of introducing a culture of *Penicillium aculaetum* into an aqueous culture medium containing dextran, allowing growth to take place until the medium contains a substantial accumulation of dextranase, and recovering the dextranase.

2. The method of claim 1, wherein *Penicillium aculaetum* ATCC No. 10409 is used.

3. The method of claim 1, wherein *Penicillium aculaetum* ATCC No. 20242 is used.

4. A method for producing dextranase which comprises the steps of introducing a culture of *Penicillium aculaetum* into an aqueous culture medium containing nutrients necessary for the growth of the microorganism and dextran, allowing growth of the microorganism to take place under aerobic conditions until the medium contains a substantial accumulation of dextranase, and recovering the accumulated dextranase from the medium.

5. The method of claim 4, wherein *Penicillium aculaetum* ATCC No. 10409 is used.

6. The method of claim 4, wherein *Penicillium aculaetum* ATCC No. 20242 is used.

* * * * *